June 5, 1951  L. H. STITES  2,555,769
WHEEL SPINNER
Filed Sept. 16, 1949
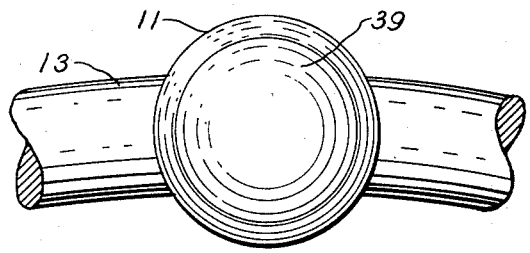
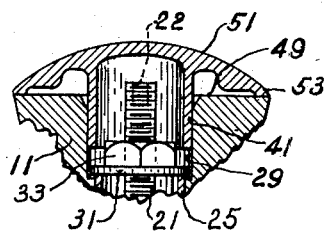
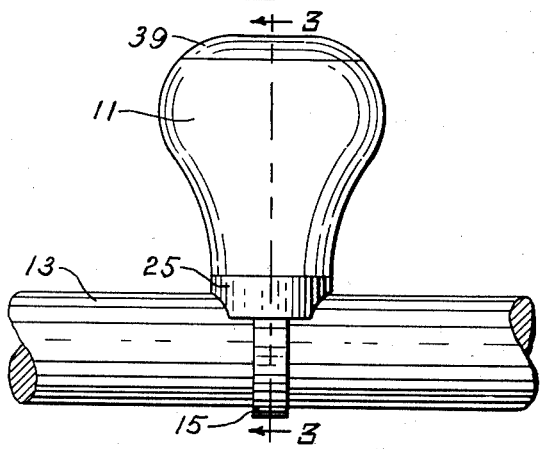
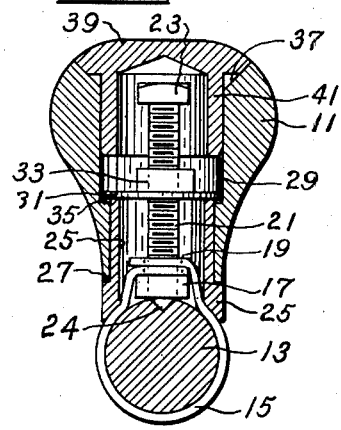
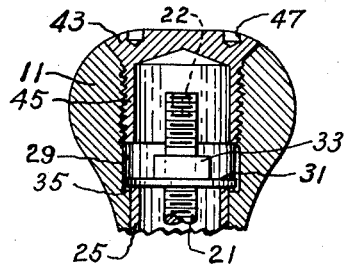
INVENTOR.
LOREN H. STITES
BY
His Attorney

Patented June 5, 1951

2,555,769

UNITED STATES PATENT OFFICE 2,555,769

WHEEL SPINNER

Loren H. Stites, Flint, Mich.

Application September 16, 1949, Serial No. 116,107

9 Claims. (Cl. 74—557)

My invention pertains to means for more conveniently turning wheels which are manually operated and more particularly to steering wheel spinners for installation and use on the steering wheels of automotive vehicles.

Such devices are well known, but prior known wheel spinners have been difficult to install, or have not been rigid and strong when installed, or have had a tendency to work loose with use. Also previously known steering wheel spinners have not been universally installable on all the different steering wheels in regular use on automotive vehicles. A further trouble with other previously known wheel spinners has been that the shape has been such as to catch upon the operator's clothing, and many have been of complicated constructions involving the use of many parts and not feasible to manufacture and supply the market demand for such a useful device.

It is accordingly an object of my invention to provide a wheel spinner which can be conveniently and quickly installed upon the rims of the various different steering wheels in common use on automotive vehicles.

It is also an object of my invention to provide such a wheel spinner which will remain rigidly mounted upon the rim of a steering wheel during use thereon.

It is a further object of my invention to provide a wheel spinner of a simple construction requiring only a few parts which can be economically manufactured, and of a smooth symmetrical shape to avoid interference with the operator.

The invention will be more readily understood and additional objects and advantages thereof will become apparent by reading the following specification in conjunction with the appended drawing, in which:

Fig. 1 is a plan view showing the improved wheel spinner installed upon a steering wheel which is broken away;

Fig. 2 is a side elevational view thereof;

Fig. 3 is a sectional view taken on line 3—3 on Fig. 2;

Fig. 4 is a similar sectional view showing modified construction; and

Fig. 5 is a similar sectional view showing still another construction which may be utilized in the improved wheel spinner.

Referring more specifically to Figs. 1, 2 and 3 of the drawings, I have illustratively disclosed an embodiment of my invention comprising a handle 11 presenting a smooth symmetrical external conformation, as shown, which will not have a tendency to catch into an operator's clothing when it is actuated to turn the rim 13 which may be part of a steering wheel (not shown) whereupon it is mounted. The lower end of this handle 11 is of a small diameter, comparable with the diameter of the rim of the wheel, and it tapers to a larger upper end to facilitate firm manual gripping thereon.

For mounting the handle, as shown in Figs. 2 and 3, a clamp band is provided, and this clamp band 15 is passed under and around the rim 13 of the wheel. The ends of this clamp band 15 are brought up over the top of the rim 13 in an overlapping relation but these are bent up to be spaced slightly above the wheel rim so that a threaded nut 17 can be inserted on top of the rim and under these ends of the clamp band. These overlapping band ends have apertures 19 in an aligned relation so that a vertically disposed threaded stud 21 may be passed therethrough and turned into the nut 17. Screwing the stud 21 firmly down into this nut lifts the nut and draws the clamp band up around the wheel rim 13 in a snug clamping relation. To facilitate this operation the upper end of the stud may be conformed for receiving a wrench, as by having a square head 23 thereon.

For rotatively supporting the handle 11, a tubular bearing member 25 is provided which is mounted down concentrically around the stud, its lower end being conformed to fit snugly upon the steering wheel rim 13 at both sides of the clamp band. The upper portion of this bearing tube 25 is turned to a smaller outside diameter leaving a larger annular shoulder 27 on the lower end. The handle 11 has an aperture 29 extending axially therethrough for fitting rotatively down over the bearing tube with its lower end resting upon the shoulder 27 thereof, which receives the downward axial thrust of the handle. From a point just under the upper end of the tubular bearing 25, the upper portion of this aperture 29, of circular cross-section, is of a larger internal diameter so that a thrust washer 31, of larger diameter than the bearing tube 25, may be inserted down concentrically around the stud and resting upon the upper end of bearing tube. A nut 33, which is threadably disposed upon the stud, is then turned down thereon and presses firmly upon the upper end of the tubular bearing 25 which is thereby firmly and rigidly mounted and held upon the steering wheel rim. The thrust washer 31, being of a larger diameter than the bearing tube 25, projects laterally and engages upon the annular shoulder 35 formed in the handle at the juncture of the larger upper portion of the aperture with the smaller lower portion, so that the rotative handle 11 is held upon the bearing tube and cannot be lifted off.

As Fig. 3 also shows, the top of the handle 11 may be provided with a diverging conical area 37 opening upwardly around the upper end of the axial aperture 29 in the handle. A closure cap 39 is provided which is conformed to fit snugly and smoothly over the open top of the handle. This cap 39 is of such a shape that it fits into the diverging conical area 37 in said handle and it also has a tubular mounting extension or neck 41 which fits snugly down into the upper end of the central aperture in the handle where it serves to hold the cap on the handle, until it is pried off by means of a screw driver or other suitable tool or instrument. The extension 41 is hollow so it fits concentrically around the upper end of the stud.

As Fig. 4 shows, the upper end of the central aperture 29 in the handle 11 may be internally threaded to receive a cover cap 43 having a neck 45 which is externally threaded to screw down into the handle. This cap is preferably provided with a pair of spaced recesses 47 so that it can be installed or removed by suitable wrench means, such as a spanner wrench.

Fig. 5 shows an arrangement wherein the upper end of the handle 11 is squared off to provide a flat annular surface 49 around the upper end of the axial aperture 29 in the handle. A cover plate 51 is provided having down turned edges 53 adapted to fit smoothly upon and around the upper edges of this handle, and having an extension or neck 41 fitting snugly down into the upper end of the central aperture of the handle to hold it thereon. As shown, the outer surface of the large upper end of this handle may be made of a conical shape. The upper end of the threaded stud 21 may be provided with a recess suitable for receiving an Allen wrench to facilitate installation. Such a wrench receiving socket is represented in dotted lines at 22 in Figs. 4 and 5, and may also be utilized in the modification shown in Fig. 3, if desired. In all these modifications, the lower end of the stud 21 may be provided with a sharp point 24 for firmer attachment upon the rim of a steering wheel.

The clamping band 15, the threaded stud and nuts, and also the tubular bearing 25, are preferably made of suitable metal parts. The handles 11 and its closure cap are preferably made of one of the plastic composition materials having suitable strength. There are many plastic materials suitable for such purposes and such materials have a more pleasing feel to the touch than metals and are available in a wide variety of pleasing colors and shades. It will be seen that a wheel spinner has been provided which is simple to manufacture and easy to install upon the rims of the various steering wheels of automotive vehicles and which is of a shape providing a knob effect so that the operator's hand will not slip off. Also the design is such as to provide a small bottom connection on the steering wheel rim with no projections or obstacles to interfere with the operator's fingers, knuckles or clothing, and having no exposed screws or bolts in sight to tempt theft of the accessory.

It is apparent that within the scope of the invention modifications and different arrangements may be made other than herein disclosed, and the present disclosure is illustrative merely, the invention comprehending variations thereof.

What I claim is:

1. A steering wheel spinner comprising, a handle of a smooth symmetrical conformation with a small attachment end tapering to a larger upper end for firm manual gripping and having an aperture of circular cross-section extending axially therethrough, the upper end of said aperture being of a larger diameter for providing an intermediate shoulder in said aperture, a clamp band for passing under and around a steering wheel rim and having apertured ends overlapping in aligned relation spaced above the rim, a threaded nut disposed under the overlapped ends of said clamp band in alignment with the apertures therein, a threaded stud disposed threadably in said nut and rising vertically through the aligned apertures in the ends of said band so that by screwing the stud down the lower end of the stud resting upon the rim lifts the nut to draw the clamp band up around said rim in a snug clamping relation, a tubular bearing disposed concentrically around said stud and adapted on the lower end for snugly fitting upon a steering wheel rim at both sides of said clamp band, the upper portion of said tubular bearing being turned down to a smaller outside diameter for rotatively receiving said handle and for providing a shoulder for receiving the downward axial thrust from the lower end of the handle, the axial length of said upper portion of the tubular bearing being slightly greater than the length of the lower small diameter portion of the aperture in said handle, a thrust washer disposed concentrically around said stud and resting upon the upper end of said tubular bearing, and a nut threadably disposed upon said stud for pressing said thrust washer down to rest firmly upon the upper end of said tubular bearing to hold firmly mounted upon said steering wheel rim, and at the same time the periphery of said thrust washer being disposed loosely over said intermediate shoulder in said handle to retain the handle rotatively thereon.

2. A steering wheel spinner in accordance with claim 1 and further characterized by having a closure cap fitting snugly and smoothly over the open top of said handle, and said closure cap having a tubular mounting extension fitting snugly down into the upper end of the aperture in said handle in concentric relation around the upper end of said stud for securing the closure cap on said handle.

3. A steering wheel spinner comprising, a handle of a smooth symmetrical conformation with a small attachment end tapering to a larger upper end for firm manual gripping and having an aperture of circular cross-section extending axially therethrough, the upper end of said aperture being of a larger diameter for providing an intermediate shoulder in said aperture, a clamp band for passing under and around a steering wheel rim and having apertured ends overlapping in aligned relation spaced above the rim, a threaded nut disposed under the overlapped ends of said clamp band in alignment with the apertures therein, a threaded stud disposed threadably in said nut and rising vertically through the aligned apertures in the ends of said band so that by screwing the stud down the lower end of the stud resting upon the rim lifts the nut to draw the clamp band up around said rim in a snug clamping relation, a tubular bearing disposed concentrically around said stud and adapted on the lower end for snugly fitting upon a steering wheel rim at both sides of said clamp band, the upper portion of said tubular bearing being turned down to a smaller outside diameter for rotatively receiving said handle and for providing a shoulder for receiving the downward axial thrust from the lower end of the handle, the axial length of said upper portion of the tubular bearing being slightly greater than the length of the lower smaller diameter portion of the aperture in said handle, a thrust washer disposed concentrically around said stud and resting upon the upper end of said tubular bearing, a nut threadably disposed upon said stud for pressing said thrust washer down to rest firmly upon the upper end of said tubular bearing to hold it firmly mounted upon said steering wheel rim, and at the same time the periphery of said thrust washer being disposed loosely over said intermediate shoulder in said handle to retain the handle rotatively thereon, said tubular mounting extension of the closure cap being externally threaded to screw into internal threads provided in the upper portion of said aperture in the handle, and said closure cap being conformed for receiving a tool or wrench for installing or removing the cap.

4. A steering wheel spinner in accordance with claim 3 and the top of said handle having a diverging conical area opening upwardly around the upper end of said aperture, and said closure cap being suitably conformed for fitting down into said conically diverging area on said handle.

5. A steering wheel spinner comprising, a handle of a smooth symmetrical conformation with a small attachment end tapering to a larger end for firm manual gripping and having an aperture of circular cross-section extending axially therethrough, the upper portion of said aperture in the handle being of a larger diameter and the handle having a flat upper surface, a clamp band for passing under and around a steering wheel rim and having apertured ends disposable in an overlapping aligned relation spaced above the rim, a threaded nut disposed under the overlapped ends of said clamp band in alignment with the apertures therein, a threaded stud disposed threadably in said nut and rising vertically through the aligned apertures in the ends of said band so that by screwing the stud down the lower end of the stud resting upon the rim lifts the nut to draw the clamp band up around said rim in a snug clamping relation, a tubular bearing disposed concentrically around said stud and adapted on the lower end for snugly fitting upon a steering wheel rim at both sides of said clamp band, the upper portion of said tubular bearing being turned down to a smaller outside diameter for rotatively bearing in the smaller lower portion of the aperture in said handle and for providing a shoulder for receiving the downward axial thrust of the handle, the axial length of said tubular bearing being slightly greater than the length of the smaller lower portion of the aperture in said handle, a thrust washer disposed concentrically around said stud in the larger portion of said aperture in the handle and resting upon the upper end of said tubular bearing, and a nut threadably disposed upon said stud for pressing firmly down upon said thrust washer to hold said tubular bearing firmly mounted upon said steering wheel rim.

6. A steering wheel spinner in accordance with claim 5 and further characterized by having a closure cap fitting snugly and smoothly over the flat upper surface of said handle, and said closure cap having a tubular mounting extension fitting snugly down into the upper end of the aperture in said handle in concentric relation around the upper end of said stud for securing the closure cap on said handle.

7. A wheel spinner comprising, a handle having a central aperture extending therethrough with the lower portion of the aperture being of a smaller diameter and providing an intermediate shoulder in the aperture, a clamp band for passing under and around a wheel rim and having apertured ends disposable in an overlapping aligned relation spaced above the rim, a threaded nut under the overlapped ends of said clamp band in alignment with the apertures therein, a threaded stud disposed threadably in said nut and rising through the aligned apertures in the ends of said band so that by screwing the stud down the lower end of the stud resting upon the rim lifts the nut to draw the clamp band up around said rim in a snug clamping relation, a tubular bearing disposed concentrically around said stud and adapted on the lower end for snugly fitting upon a wheel rim at both sides of said clamp band, the upper portion of said tubular bearing being turned down to a smaller outside diameter for a pivot bearing in the smaller lower portion of the aperture in said handle and for providing a shoulder for receiving the downward axial thrust of the lower end of said handle, the axial length of said tubular bearing being slightly greater than the length of the smaller lower portion of the aperture in said handle, a thrust washer disposed concentrically around said stud in the larger portion of said aperture in the handle and resting upon the upper end of said tubular bearing, a nut threadably disposed upon said stud for pressing firmly down upon said thrust washer to hold said tubular bearing firmly mounted upon said wheel rim, and said thrust washer being of a greater diameter than the upper end of said bearing tube for overhanging the shoulder formed in the handle at the juncture of the larger portion of said handle aperture with the smaller lower portion thereof so that the thrust washer also serves to hold the handle for free rotation upon said tubular bearing.

8. A steering wheel spinner in accordance with claim 7 and the top of said handle having a diverging conical area opening upwardly around the upper end of said aperture, and said closure cap being suitably conformed for fitting down into said conically diverging area on said handle.

9. A steering wheel spinner in accordance with claim 8 and further characterized by said tubular mounting extension of the closure cap being externally threaded to screw into internal threads provided in the upper portion of said aperture in the handle, and said closure cap being formed for receiving a tool or wrench for installing or removing the cap.

LOREN H. STITES.

REFERENCES CITED

The following references are of record in the file of this patent:

UNITED STATES PATENTS

| Number | Name | Date |
|---|---|---|
| 1,784,230 | Freeman | Dec. 9, 1930 |
| 2,118,540 | Van Arsdel | May 24, 1938 |
| 2,267,308 | Russel et al. | Dec. 23, 1941 |
| 2,432,262 | Thorp | Dec. 9, 1947 |